United States Patent [19]

DeViney et al.

[11] 4,387,305

[45] Jun. 7, 1983

[54] EMERGENCY POWER SYSTEM FOR ELECTROMAGNETS

[75] Inventors: Terrence E. DeViney, Seven Hills; Richard W. Ochendowski, Maple Heights, both of Ohio

[73] Assignee: Control Specialties, Inc., Valley View, Ohio

[21] Appl. No.: 273,099

[22] Filed: Jun. 11, 1981

[51] Int. Cl.³ .............................................. H02J 9/06
[52] U.S. Cl. ...................................... 307/66; 361/144; 361/139
[58] Field of Search ...................... 361/139, 144, 145; 307/66, 86; 315/86

[56] References Cited

U.S. PATENT DOCUMENTS

| | | | |
|---|---|---|---|
| 3,356,857 | 12/1967 | Strasen et al. | 307/66 |
| 3,774,050 | 11/1973 | Littwin | 361/144 X |
| 4,032,828 | 6/1977 | Strobl et al. | 361/139 X |
| 4,044,268 | 8/1977 | Hammel et al. | 307/66 |

FOREIGN PATENT DOCUMENTS 1266353  3/1972  United Kingdom ................. 307/66

Primary Examiner—Reinhard J. Eisenzopf
Attorney, Agent, or Firm—James A. Hudak

[57] ABSTRACT

A system is disclosed for providing emergency power to a load, such as an electromagnet (36), in the event of the failure of the main power source (20). The system utilizes two series connected battery banks (26, 28) which have a combined output voltage that exceeds the output voltage of the main power source (20), and which are maintained in a fully charged state by means of a battery charger (42). Upon the failure of the main power source (20), control circuitry (58) instantaneously transfers the battery banks (26, 28) to the magnet (36) preventing the dropping of the load. A timing relay is provided to periodically sense whether the main power source (20) has been restored, and to disconnect the battery banks (26, 28) from the magnet (36) after restoration has occurred.

10 Claims, 1 Drawing Figure

EMERGENCY POWER SYSTEM FOR ELECTROMAGNETS

TECHNICAL FIELD

The present invention relates to a system for applying emergency power to an electromagnet, and more particularly to a completely fail safe power system for electromagnets.

BACKGROUND ART

Emergency power systems for electromagnets have been available to insure that the magnets do not drop the load which they are holding in the event of a power failure. Typically, these systems utilize a bank of batteries which are charged directly off of the incoming DC power line, and thus, cannot be charged to a value in excess of the incoming power line voltage. When a fault occurs, a switching arrangement is provided to introduce these batteries into the circuit in order to provide sufficient voltage to the magnet so that it does not drop its load. However, inasmuch as these batteries are initially at a voltage which approximates the voltage of the incoming power source and subsequently decay therefrom, it is possible that the batteries will not provide sufficient voltage to the electromagnet in order to hold the load. In essence, in this arrangement the voltage applied to the electromagnet by the battery bank is always less than the voltage which would be applied by the main power source, and this can present problems in holding a difficult load such as a multiple plate load wherein the flux in the last plate is not strongly coupled to that in other plates comprising the load. This condition could result in the electromagnet starting to drop all or a portion of the load.

If the batteries are charged from a source other than the incoming DC power line, they can be charged to a voltage in excess of the incoming power line voltage, however, these systems typically utilize mechanical transfer means to connect the batteries to the magnet in the event of a power failure. Because mechanical transfer means are used, the transfer is not instantaneous and thus the magnetic flux, particularly the flux associated with relatively small magnets, could be affected resulting in the possible dropping of the load.

Because of the foregoing, it has become desirable to develop a system which always applies sufficient voltage to an electromagnet to hold its load and which instantaneously transfers to the battery supply in the event of a main power source failure.

SUMMARY OF THE INVENTION

The present invention solves the aforementioned problems associated with the prior art as well as other problems by utilizing a battery charger to charge two separate battery banks connected in series, to a voltage which exceeds that of the incoming power source voltage. The battery charger maintains the battery banks in a fully charged condition at all times. In the event of the failure of the incoming power source, control circuitry is provided to instantaneously transfer both battery banks across the magnet controller and thus across the lifting magnet in order to provide sufficient voltage to hold the load. Means are provided to periodically sense whether the incoming power source has been restored, and if so, to disconnect the battery banks from the magnet controller and the lifting magnet. Such a disconnection can occur only after the restoration of the main power source, thus insuring fail safe operation.

In view of the foregoing, it will be seen that one aspect of the present invention is to provide a system for supplying emergency battery power to an electromagnet.

Another aspect of the present invention is to provide a system which permits the emergency battery power supply to be charged to a voltage higher than that of the incoming power source so that sufficient battery voltage will be available to be applied to the electromagnet in the event of a failure of the main power source.

A further aspect of the present invention is to provide a system which permits the emergency battery power to be instantaneously transferred to the load in the event of a failure of the main power source.

Still another aspect of the present invention is to provide a battery charger for maintaining the emergency battery power supply in a fully charged condition at all times.

Yet another aspect of the present invention is to provide a system which is fail safe in that the emergency battery power supply is not disconnected from the magnet until after the main power source has been restored.

Yet still another aspect of the present invention is to provide a system wherein the individual battery cells of the emergency battery power supply can be safely charged to their float voltage.

These and other aspects of the present invention will become more clearly understood after a review of the following description of the preferred embodiment when considered with the following drawing.

DESCRIPTION OF THE PREFERRED EMBODIMENT

Figure 1:
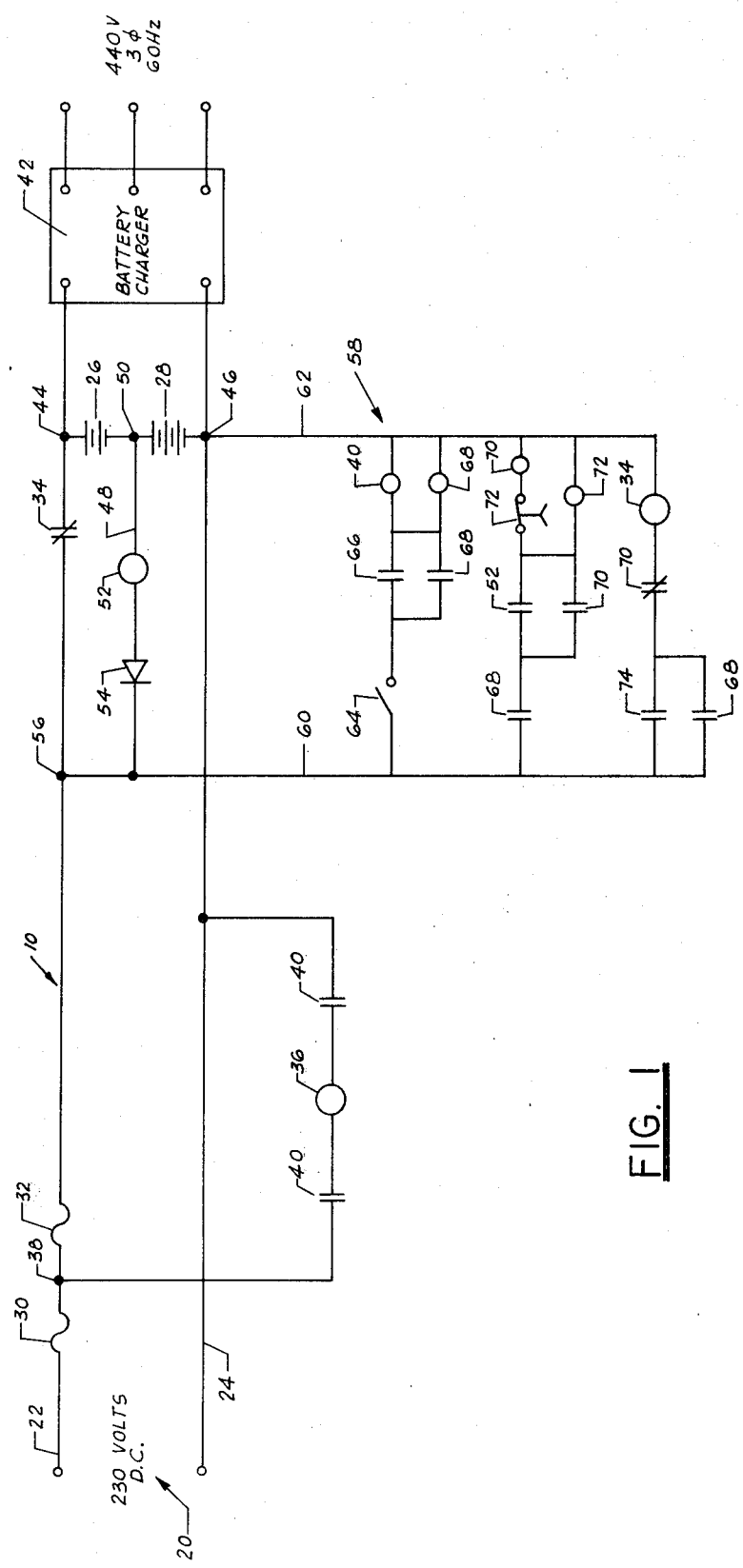
FIG. 1 is an electrical schematic drawing of the present invention of the disclosure.

Referring now to the drawing where the illustration is for the purpose of describing the preferred embodiment of the present invention and is not intended to limit the invention hereto, FIG. 1 is a schematic drawing of the circuit 10 used by the apparatus of the present invention. In FIG. 1, a power source 20, such as a 230 volt DC power supply, is connected by conductors 22, 24, to two series connected DC battery banks 26, 28 via overload protection devices 30, 32 and a normally closed isolation contact 34 located in the conductor 22. A lifting magnet 36 is connected to the junction 38 of the overload protection devices 30, 32 in the conductor 22 and to the conductor 24 via normally open lifting magnet contacts 40. The output of a battery charger 42 is connected across the series combination of the battery banks 26, 28 at points 44, 46 and maintains the battery banks in a fully charged condition. The input to the battery charger 42 is typically connected to a 440 volt, 3 phase, 60 Hz supply which powers same. Inasmuch as the lifting magnet 36 and the battery charger 42 are standard components, a detailed description of their construction and/or operation will not be undertaken herein.

A conductor 48 is connected to the junction 50 of the battery banks 26, 28 and to a relay coil 52 which, in turn, is connected to the input to an isolating diode 54, the output of which is connected to the conductor 22 at point 56. The control circuit, shown generally as numeral 58, is comprised of conductors 60 and 62, and is connected to the conductors 22, 24 at points 56, 46, respectively, so that typically 230 volts DC is applied thereacross. The conductor 60 is connected to a lift switching device 64 for the magnet which is connected to the parallel combination of a normally open battery charger contact 66 and a normally open lift pilot relay contact 68. This parallel combination is connected to the parallel combination of the lift relay coil 40 and the lift pilot relay coil 68 which, in turn, is connected to the conductor 62. Conductor 60 is also connected to a normally open lift pilot relay contact 68 which is connected to the parallel combination of normally open rlay contacts 52, 70 which, in turn, is connected to a timing relay coil 72 connected in parallel with the series combination of a normally closed timing relay contact 72 and the relay coil 70. This latter parallel combination is, in turn, connected to the conductor 62. Also connected across the conductors 60, 62 is a parallel combination of a normally open battery charger contact 74 and a normally open lift pilot relay contact 68 which is connected to the series combination of a normally closed relay contact 70 and the isolation relay coil 34 whose associated normally closed contact 34 is located in conductor 22 between points 56 and 44.

The battery banks 26, 28 are two separate groups of DC cells, and typically comprise 46 and 154 nickel cadmium cells, respectively. Inasmuch as each of these cells has a float voltage of approximately 1.40 volts, the voltage across points 44, 46 can approach 280 volts DC. Typically when these batteries are put into use, their output voltage rapidly drops to approximately 1.25 volts and subsequently decays slightly from that value. Thus, when the battery banks 26, 28 are utilized by the system, the voltage across points 44, 46 drops rapidly to 250 volts DC and decays slightly therefrom, however, the voltage across points 44, 46 does not drop below 230 volts DC. In addition, because of the number of cells involved in the battery bank 28 is 154 cells, the voltage across points 46, 50 never exceeds 210 volts DC and typically is approximately 190 volts DC when the battery banks 26, 28 are supplying power to the magnet 36. It should be noted that the number of cells in the battery banks 26, 28 can be varied depending upon the voltage required which, in turn, is dependent upon the type of load involved.

The battery charger 42 is designed and adjusted to produce an output voltage which matches that of the battery banks 26, 28. Thus, typically the battery charger 42 produces an output voltage having a rating of approximately 310 volts DC for high rate charging, 280 volts DC float voltage, and 250 volts DC nominal voltage. In addition, the battery charger 42 contains logic circuitry which closes the normally open contacts 66 and 74 when the battery charger 42 is operating and the battery banks 26, 28 are up to a fully charged condition, thus insuring that the overall system cannot be operated unless the foregoing conditions are present.

To operate the system, the lift switching device 64 is closed. If the battery charger 42 is operating and the battery banks 26, 28 are fully charged, the normally open battery charger contact 66 will be closed, energizing the lift relay coil 40 which, in turn, closes the normally open lifting magnet contacts 40 connecting the lifting magnet 36 across the power source 20. While this is occurring, the lift pilot relay coil 68 is energized causing the closing of the normally open relay contact 68 so as to interlock the battery charger contact 66 insuring that if the battery charger 42 should, for some reason, become inoperable or if the output voltage of the battery banks 26, 28 should drop, power will continue to be supplied to the lifting magnet 36 from the power source 20, so that the load will not be dropped. (Alternatively, in the event of a failure of the power source 20, the lifting magnet 36 will be powered by the battery banks 26, 28 as will be hereinafter described.) In addition, during normal operation of the system, the normally open battery charger contact 74 is closed energizing the isolation relay coil 34 which, in turn, opens the normally closed isolation contact 34 insuring that the battery banks 26, 28 are not applied across the lifting magnet 36. It should be noted that during normal operation of the system, i.e., the power source 20 supplying power to the lifting magnet 36, the voltage at the junction 50 is approximately 210 volts DC and is always less than the voltage of the power source 20 thus preventing the relay coil 52 from being energized and the isolation diode 54 from conducting. This, in turn, prevents the relay coil 70 from being energized which would cause the de-energization of the isolation relay coil 34 and the closing of its associated isolation contact 34 connecting the battery banks 26, 28 across the lifting magnet 36.

If, however, the power source 20 fails, then the relay coil 52 is energized and the isolation diode 54 conducts which causes the relay coil 70 and the timing relay coil 72 to be energized since the normally open relay contacts 68 and 52 are closed. The energization of the relay coil 70 causes the opening of the normally closed relay contact 70 and the de-energization of the isolation relay coil 34 which, in turn, causes the closing of the isolation relay contact 34 applying the full voltage of the battery banks 26, 28 across the lifting magnet 36. The foregoing occurs instantly and thus the lifting magnet 36 does not drop its load. In this manner, the full voltage of the battery banks 26, 28, which is typically approximately 250 volts DC and does not drop below 230 volts DC, is applied across the lifting magnet 36 thus insuring that the magnet 36 does not drop the load that it is holding.

As soon as the battery banks 26, 28 are applied across the lifting magnet 36, the relay coil 52 becomes de-energized since the diode 54 is back biased by the battery bank 28 thus forcing the diode 54 into a non-conducting state. The de-energization of the relay coil 52 causes the opening of its associated normally open contact 52, however, the relay coil 70 and the timing relay coil 72 remain energized since the relay contact 52 is interlocked by the relay contact 70. In this condition it cannot be determined when the power source 20 comes back on line. In order to determine when restoration of power occurs, the timing relay coil 72 periodically opens its associated contact 72 thus de-energizing the relay coil 70 which, in turn, energizes the isolation relay coil 34 opening its associated isolation contact 34 in the conductor 22. If the power source 20 has not come back on line, the relay coil 52 is energized and the isolation diode 54 conducts. As soon as the timing relay contact 72 closes, the relay coil 70 is energized which, in turn, causes the de-energization of the isolation relay coil 34 and the closing of its associated contact 34 in the conductor 22 and the re-application of the battery banks 26, 28 across the lifting magnet 36. As soon as this occurs, the relay coil 52 becomes de-energized, however, the relay coil 70 and the timing relay coil 72 remain energized because the relay contact 70, which is closed, acts as an interlock across the relay contact 52. If, however, when the timing relay coil 72 opens its associated contact 72 thus de-energizing the relay coil 70 and energizing the isolation relay coil 34 so as to open its associated contact 34, the power source 20 has come back on line, then relay coil 52 will not be energized and the isolation diode 54 will not conduct. The timing relay contact 72 then closes, however, the relay coil 70 and the timing relay coil 72 remain de-energized and the isolation relay coil 34 remains energized thus insuring that the battery banks 26, 28 are disconnected from the lifting magnet 36.

A unique feature of this system is that drainage of the battery banks 26, 28 is prevented during system shutdown. When the system is shutdown, the battery charger contact 74 is open preventing the draining of the battery banks. However, once the system is energized and a lift is in progress, the normally open relay contact 68 across the contact 74 is closed bypassing the contact 74.

A protective feature of the system involves the use of dual overload protection devices 30 and 32. Typically, these devices are of dissimilar values and the device 32 has a higher overload rating than the device 30. In the event of failure of the power source 20, such as a short circuit therein, the protection device 30 opens and the lifting magnet 36 is powered by the battery banks 26, 28 via the overload protection device 32, thus protecting the magnet 36. If, however, the fault or short circuit occurs in the lifting magnet 36, the protection device 30 will still open and the protection device 32 prevents any damage to the battery banks 26, 28.

From the foregoing it is apparent that the foregoing system has many advantages over the prior art in that the battery banks 26, 28 are always in a fully charged condition, are instantaneously transferred to the lifting magnet 36 at the time of power failure, and have sufficient voltage at that time to maintain holding the load. In addition, the system provides that the battery banks 26, 28 are not disconnected from the lifting magnet 36 until after the main power source is up to full voltage. Thus, the overall system is fail safe.

Certain modifications and improvements will occur to those skilled in the art upon reading the foregoing. It should be understood that all such modifications and improvements have been deleted herein for the sake of conciseness and readability but are properly within the scope of the following claims.

We claim:

1. A system for supplying electrical power to a load in the event of a failure in the main power source comprising a first bank of batteries, a second bank of batteries connected to said first bank of batteries, said first battery bank having an output voltage less than the output voltage of said main power source and greater than the output voltage of said second battery bank, means for sensing a failure in said main power source, said sensing means comparing the output voltage of said main power source with the output voltage of said first battery bank to determine if a failure in said main power source has occurred, and means responsive to said sensing means to instantaneously connect said first and second battery banks to said load upon the occurrence of a failure in said main power source.

2. The system as defined in claim 1 wherein the combined output voltage of said first and second battery banks is greater than the output voltage of said main power source.

3. The system as defined in claim 2 further including means for charging said first and second battery banks to a level whereat the combined output voltage of said first and second battery banks is greater than the output voltage of said main power source.

4. The system as defined in claim 3 further including means for preventing the operation of said system if said first and second battery banks are not in a fully charged condition and if said charging means is not in an operable condition.

5. The system as defined in claim 1 further including means for determining when said main power source has been restored after a power failure, said determining means insuring that said first and second battery banks remain connected to said load until said main power source has been restored.

6. The system as defined in claim 5 wherein said determining means includes timing means to periodically sample the output voltage of said main power source to determine of said main power source has been restored after a failure of same.

7. The system as defined in claim 1 further including means for preventing the draining of said first and second battery banks when said system is inactive.

8. The system as defined in claim 1 further including first overload protection means between said main power source and said load to protect said load in the event of a fault in said main power source, and a second overload protection means between said first and second battery banks and said load to protect said battery banks in the event of a fault in said main power source.

9. A system for supplying electrical power to a load in the event of a failure in the main power source comprising a first bank of batteries, a second bank of batteries connected to said first bank of batteries, said first battery bank having an output voltage less than the output voltage of said main power source and greater than the output voltage of said second battery bank, the combined output voltage of said first and second battery banks being greater than the output voltage of said main power source, means for sensing a failure in said main power source, said sensing means comparing the output voltage of said main power source with the output voltage of said first battery bank to determine if a failure in the main power source has occurred, means responsive to said sensing means to instantaneously connect said first and second battery banks to said load upon the occurrence of a failure in said main power source, and means for determining when said main power source has been restored after a power failure, said determining means insuring that said first and second battery banks remain connected to said load until said main power source has been restored.

10. A system for supplying electrical power to a load in the event of a failure in the main power source comprising a first bank of batteries, a second bank of batteries connected to said first bank of batteries, said first battery bank having an output voltage less than the output voltage of said main power source and greater than the output voltage of said second battery bank, the combined output voltage of said first and second battery banks being greater than the output voltage of said main power source, means for sensing a failure in said main power source, said sensing means comparing the output voltage of said main power source with the output voltage of said first battery bank to determine if a failure in the main power source has occurred, means responsive to said sensing means to instantaneously connect said first and second battery banks to said load upon the occurrence of a failure in said main power source, and means for determining when said main power source has been restored after a power failure, said determining means including timing means to periodically sample the output voltage of said main power source to determine if said main power source has been restored after a failure of same in order to insure that said first and second battery banks remain connected to said load until said main power source has been restored.

* * * * *